(12) United States Patent
Abe et al.

(10) Patent No.: US 7,322,599 B2
(45) Date of Patent: Jan. 29, 2008

(54) KNEE BAG AND LEG PROTECTION SYSTEM

(75) Inventors: Kazuhiro Abe, Berlin (DE); Masayoshi Kumagai, Ika-gun (JP); Yoshiki Murakami, Konan (JP)

(73) Assignee: Takata Corporation, Tokyo (JP)

( * ) Notice: Subject to any disclaimer, the term of this patent is extended or adjusted under 35 U.S.C. 154(b) by 421 days.

(21) Appl. No.: 11/004,940

(22) Filed: Dec. 7, 2004

(65) Prior Publication Data

US 2005/0127643 A1 Jun. 16, 2005

(30) Foreign Application Priority Data

Dec. 12, 2003 (JP) ............... 2003-415191

(51) Int. Cl.
*B60R 21/16* (2006.01)
*B60R 21/20* (2006.01)
(52) U.S. Cl. ................ 280/730.1; 280/743.2
(58) Field of Classification Search ............ 280/730.1, 280/743.2
See application file for complete search history.

(56) References Cited

U.S. PATENT DOCUMENTS 6,155,595 A 12/2000 Schultz

2003/0120409 A1 6/2003 Takimoto et al.
2004/0164527 A1* 8/2004 Nagata et al. ........... 280/730.1
2004/0262896 A1* 12/2004 Mizuno et al. .......... 280/730.1

FOREIGN PATENT DOCUMENTS

| EP | 1 310 408 | 5/2003 |
| EP | 1 314 617 | 5/2003 |
| EP | 1 350 689 | 10/2003 |
| JP | 2003-182504 | 7/2003 |

* cited by examiner

*Primary Examiner*—Ruth Ilan
(74) *Attorney, Agent, or Firm*—Manabu Kanesaka

(57) ABSTRACT

A knee bag to be inflated upwardly from below in front of legs of a vehicle occupant includes an upper part constituting a constant width portion having a substantially constant lateral width, and a lower part below the constant width portion having a lateral width decreasing toward a lower end. Tethers extending laterally are provided vertically in the knee bag in multistage, and an upper tether has a longer lateral length. Vent spaces are formed between respective lateral ends of the tethers and lateral edges of the knee bag. The uppermost tether is located in the vicinity of or above a boundary between the constant width portion and a narrow width portion.

7 Claims, 3 Drawing Sheets

KNEE BAG AND LEG PROTECTION SYSTEM

BACKGROUND OF THE INVENTION AND RELATED ART STATEMENT

The present invention relates to a knee bag for restraining a movement of knees of an occupant in a vehicle in an event of a collision of the vehicle so that a lower body of the occupant does not move toward a front side of the vehicle to prevent lower legs of the occupant from striking against an interior panel in front of a seat. The present invention also relates to an occupant leg protection system including the knee bag.

An occupant leg protection system protects lower legs of an occupant from striking against an interior panel in front of a seat, so that the lower legs do not receive a large load in an event of a head-on collision of a high-speed mobile unit such as an automobile. Such an occupant leg protection system includes a knee bag to be inflated toward the front of the occupant legs and an inflator (gas generator) for inflating the knee bag.

Japanese Patent Publication (Kokai) No. 2003-182504 has described a knee bag to be inflated upwardly from below in front of occupant legs. The knee bag is formed such that a lower part thereof has a width in a lateral direction (hereinafter, also referred to as a lateral width) decreasing toward a lower end. A diffuser diffuses gas from an inflator in the lateral direction in the knee bag. Tethers are provided for joining a base fabric of the knee bag adjacent to the occupant and a base fabric adjacent to an instrument panel (interior panel), and are disposed vertically in multistage.

In Japanese Patent Publication (Kokai) No. 2003-182504, the tethers are structured such that the uppermost tether has the smallest lateral width. Accordingly, an outline of the uppermost chamber of the knee bag becomes unclear, and this may delay completion of inflation of the uppermost chamber.

In view of the problem described above, an object of the present invention is to provide a knee bag to be quickly deployed vertically and laterally, and an occupant leg protection system including the knee bag.

Further objects and advantages of the invention will be apparent from the following description of the invention.

SUMMARY OF THE INVENTION

In order to attain the objects described above, according to a first aspect of the present invention, a knee bag is to be inflated in front of legs of a vehicle occupant. The knee bag is to be inflated upwardly from below, and has an upper part constituting a constant width portion having a substantially constant lateral width. A part below the constant width portion has a lateral width decreasing toward a lower end. Continuous tethers extending laterally are provided vertically in the knee bag in multistage, and an upper tether has a longer lateral length. Vent spaces are formed between respective lateral ends of the tethers and lateral edges of the knee bag. The uppermost tether is located in the vicinity of or above a boundary between the constant width portion and a narrow width portion.

According to a second aspect of the present invention, in the knee bag in the first aspect, a diffuser is provided at a lower part of the knee bag for directing gas from an inflator for inflating the knee bag only in the lateral direction in the knee bag.

According to a third aspect of the present invention, in the knee bag in the first aspect or the second aspect, when the knee bag is inflated, each of the vent spaces formed between the respective lateral ends of the tethers and the lateral edges of the knee bag has a flow-channel cross section of 3,000 $mm^2$ to 7,850 $mm^2$.

According to a fourth aspect of the present invention, an occupant leg protection system includes the knee bag according to the invention and an inflator for inflating the knee bag.

In the knee bag and the occupant leg protection system according to the present invention, when the knee bag is inflated by gas from the inflator, the gas flows upwardly through the vent spaces between the lateral ends of the tethers and the lateral edges of the knee bag to inflate the uppermost chamber. The lower part of the knee bag has a lateral width decreasing toward a lower end (in other words, the lateral width becomes larger toward an upper end). Accordingly, the knee bag is inflated upwardly while expanding laterally, and the upper part of the knee bag is inflated so as to connect inflated portions of the lateral edges to extend laterally. Then, the vicinity of the center of the knee bag is inflated.

The uppermost tether has the largest lateral width and is located in the vicinity of or above the boundary between the constant width portion and the narrow width portion. Also, the uppermost chamber of the knee bag has a relatively small volume, so that the uppermost chamber of the knee bag is inflated quickly. Accordingly, in the present invention, the lateral sides and the upper part of the knee bag are inflated quickly to be deployed laterally and upwardly.

In the second aspect of the present invention, the gas from the inflator is directed laterally, so that the knee bag is deployed laterally further quickly. In the third aspect of the present invention, the gas from the inflator flows upwardly along the lateral edges of the knee bag quickly, so that the knee bag is inflated further quickly.

DETAILED DESCRIPTION OF PREFERRED EMBODIMENTS

Figure 1:
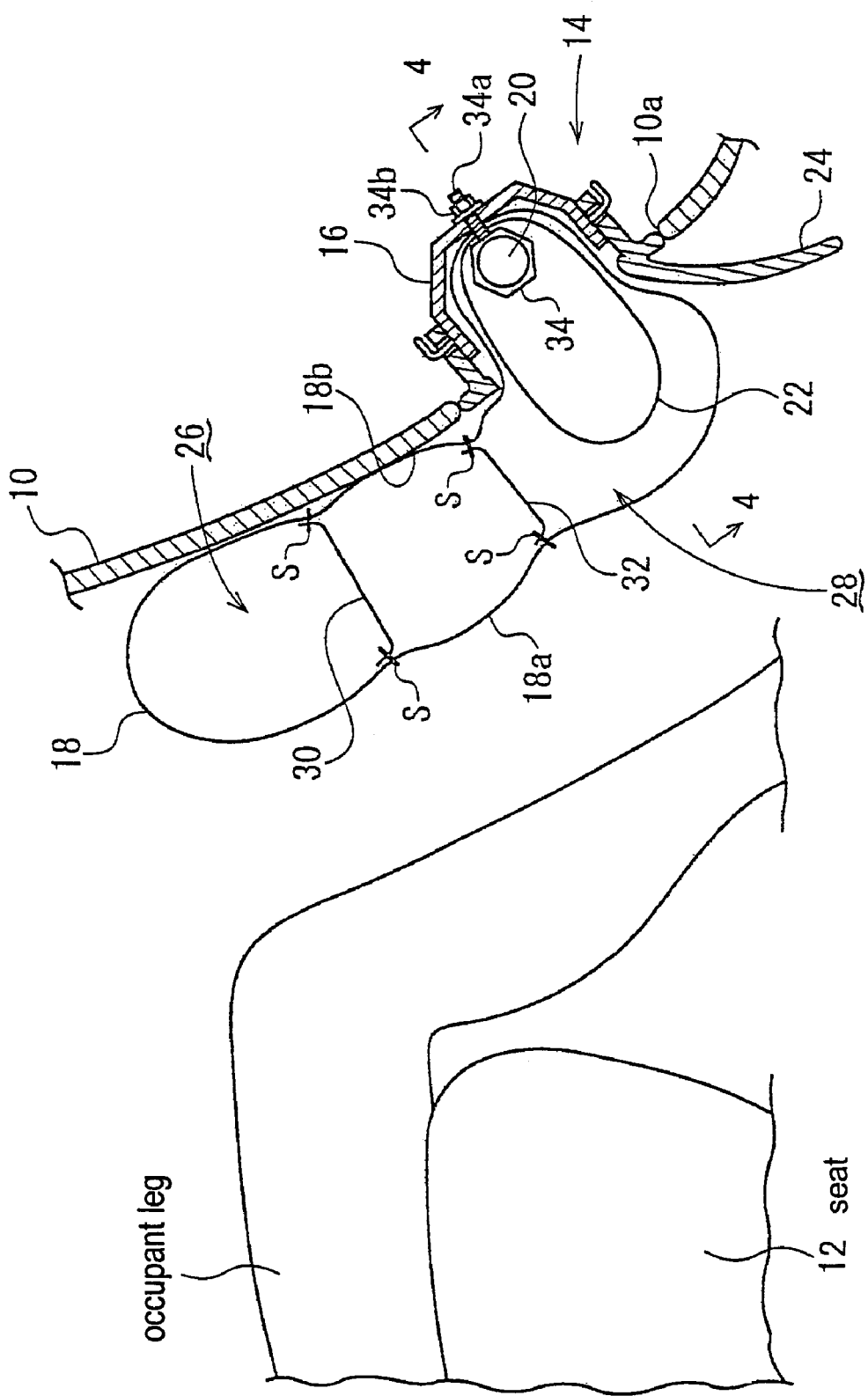
FIG. 1 is a cross-sectional view of the vicinity in front of a vehicle seat showing an inflated state of a knee bag according to an embodiment of the present invention.
Figure 2A:
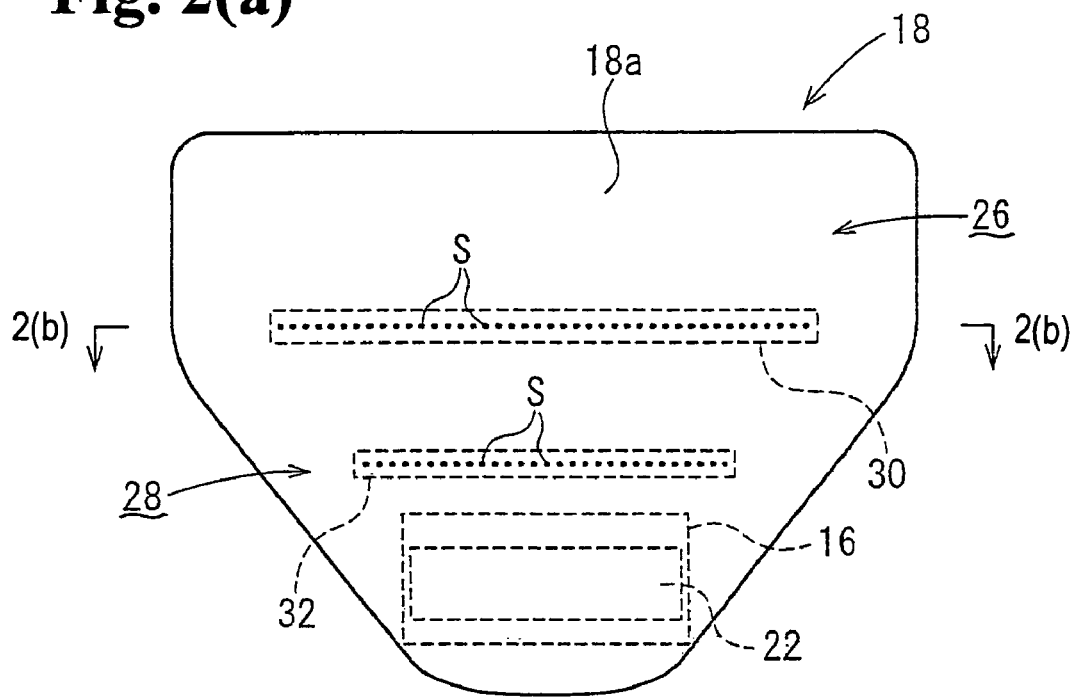
FIG. 2(a) is a front view of the knee bag shown in FIG. 1 in the inflated state.
Figure 2B:
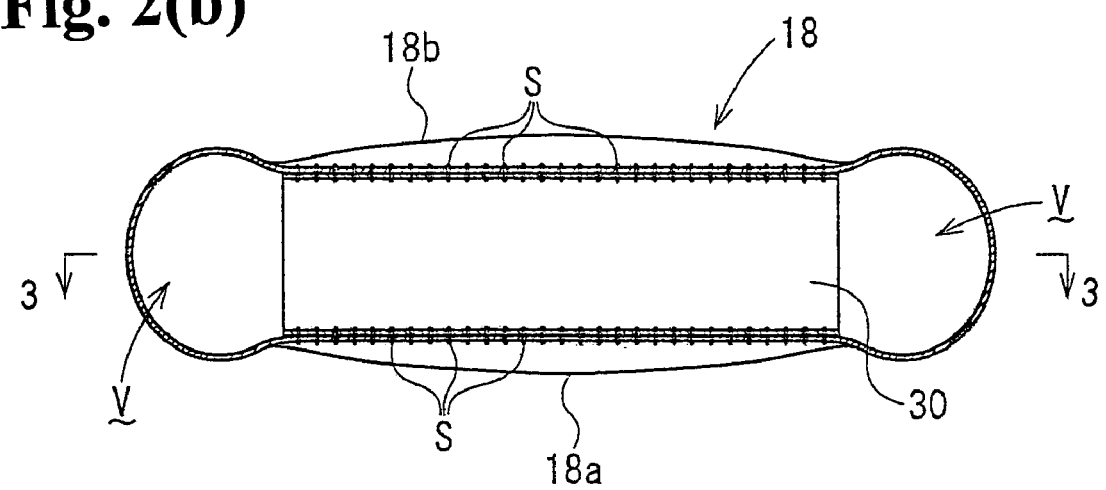
FIG. 2(b) is a cross-sectional view taken along line 2(b)-2(b) in FIG. 2(a)
Figure 3:
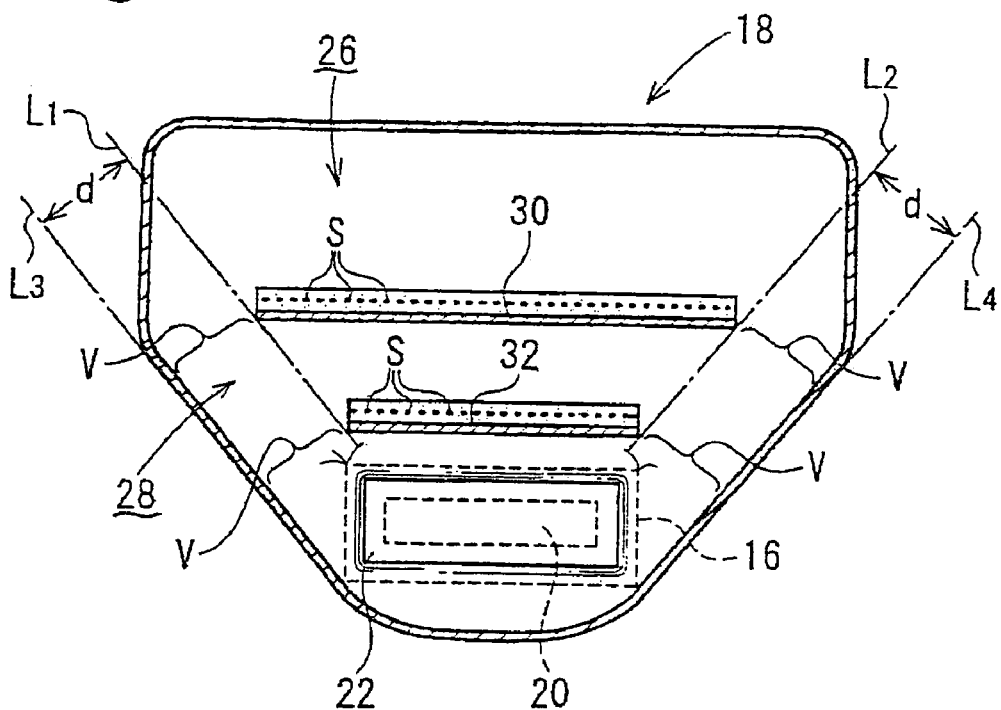
FIG. 3 is a cross-sectional view taken along line 3-3 in FIG. 2(b)
Figure 4:
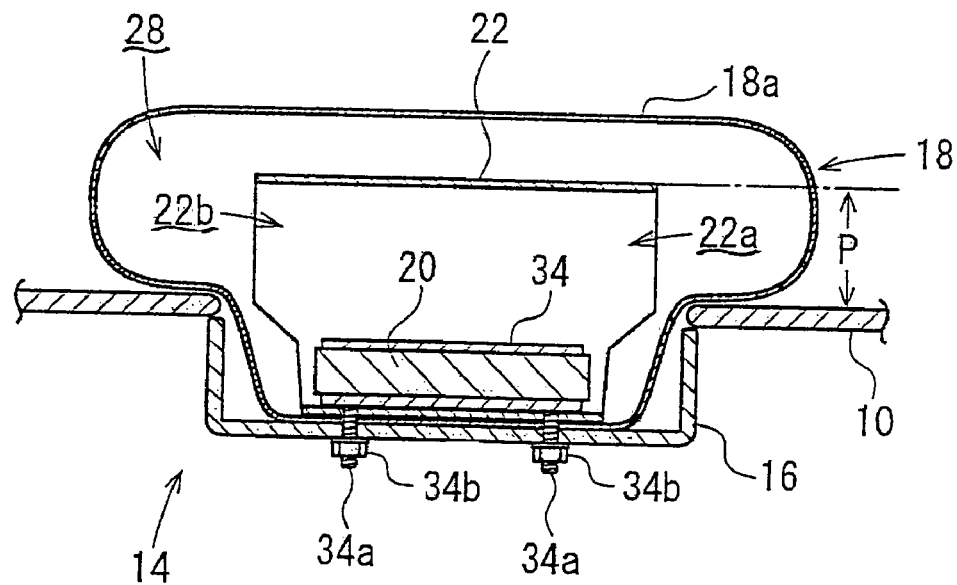
FIG. 4 is a cross-sectional view taken along line 4-4 in FIG. 1.

Hereunder, embodiments of the present invention will be described with reference to the accompanying drawings. FIG. 1 is a cross-sectional view of the vicinity in front of a vehicle seat showing an inflated state of a knee bag according to an embodiment of the present invention. FIG. 2(a) is a front view of the knee bag shown in FIG. 1 in the inflated state. FIG. 2(b) is a cross-sectional view taken along line 2(b)-2(b) in FIG. 2(a). FIG. 3 is a cross-sectional view taken along line 3-3 in FIG. 2(b). FIG. 4 is a cross-sectional view taken along line 4-4 in FIG. 1. In the following description, a lateral direction means a direction along a width of a vehicle.

An occupant leg protection system 14 is mounted to an interior panel 10 in front of a seat 12. The occupant leg protection system 14 includes a container-like retainer 16 with an open front surface (adjacent to an occupant); a knee bag 18 connected to the retainer 16; an inflator (gas generator) 20 for inflating the knee bag 18; and a diffuser 22 disposed in the knee bag 18 for directing the gas flow laterally in the knee bag 18.

The retainer 16 is disposed in an opening 10$a$ of the interior panel 10. The knee bag 18 and the diffuser 22 are accommodated in a folded state in the retainer 16 in a normal state, and a lid 24 is attached to the front surface of the retainer 16 to cover the folded knee bag 18. The lid 24 is arranged to be substantially flush with the interior panel 10 in a normal state. As shown in FIG. 1, when the knee bag 18 is inflated, the lid 24 is opened toward a front side of the interior panel 10 with a lower end thereof as fulcrum.

As shown in FIG. 1, the opening 10$a$ is provided at a position lower than a seating surface of the seat 12. The knee bag 18 is inflated upwardly from below along the front surface (surface adjacent to the occupant) of the interior panel 10 from the opening 10$a$. Referring to FIG. 2, the upper part of the knee bag 18 constitutes a constant width portion 26 having a substantially constant lateral width across a predetermined vertical width. A part of the knee bag 18 below the constant width portion 26 constitutes a narrow-width portion 28 having a lateral width decreasing toward a lower end. The lower end of the narrow-width portion 28 is connected to the retainer 16.

When the knee bag 18 is inflated upwardly from below along the front surface of the interior panel 10 through the opening 10$a$, the constant width portion 26 is located above a seating surface of the seat 12. Therefore, when the knee bag 18 is inflated in front of the occupant legs, the constant width portion 26 faces the vicinity of the knees of the occupant seated in the seat 12. The lateral width of the constant width portion 26 is preferably in the range from 500 mm to 600 mm. The lateral width of the front opening of the retainer 16 is preferably less than a half of the lateral width of the constant width portion 26, particularly from 40% to 50% thereof.

Referring to FIG. 4, the narrow-width portion 28 preferably has a shape such that lateral edges thereof extend between lateral edges of the constant width portion 26 and lateral lower corners of the front opening of the retainer 16. The knee bag 18 has tethers 30 and 32 for connecting a front surface (base fabric adjacent to the occupant) 18$a$ of the KNEE BAG 18 and a rear surface (base fabric adjacent to the interior panel 10) 18$b$ in multistage (two stages in this embodiment). Symbol S denotes seams for connecting the tethers 30 and 32 with the front surface 18$a$ and the rear surface 18$b$, respectively. The upper tether 30 is disposed in the vicinity of the boundary between the constant width portion 26 and the narrow-width portion 28 or at a position slightly above the boundary (preferably, in the range of 0 mm to 70 mm above the boundary between the constant width portion 26 and the narrow-width portion 28). The lower tether 32 is disposed at the vertical middle of the narrow-width portion 28.

The tethers 30 and 32 extend in the lateral direction and are attached to the front surface 18$a$ and the rear surface 18$b$ across a predetermined lateral width. As shown in FIG. 2($b$), respective lateral ends of the tethers 30 and 32 are separated from the lateral edges of the knee bag 18. Between the lateral ends of the tethers 30 and 32 and the lateral edges of the knee bag 18, vent spaces V are formed, respectively.

Each of the vent spaces V has a flow channel cross section preferably in the range from 3,000 mm$^2$ to 7,850 mm$^2$, more preferably, from 4,500 m$^2$ to 5,500 mm$^2$. In this case, an interval (shortest distance) between the respective both ends of the tethers 30 and 32 and the lateral edges of the knee bag 18 is preferably in the range from 80 mm to 130 mm, more preferably, from 90 mm to 120 mm.

As shown in FIG. 3, in the invention, it is particularly preferable that line L1 between left ends of the tethers 30 and 32 and line L2 between right ends are parallel to lines L3 and L4 extending along the lateral edges of the narrow-width portion 28, respectively. Distances d between the lines L1 and L3 and between the lines L2 and L4 are preferably in the range from 80 mm to 130 mm, more preferably, from 90 mm to 120 mm. With such a structure, gas from the inflator 20 flows quickly and upwardly along the lateral edges of the narrow-width portion 28 through the vent spaces V.

The diffuser 22 is disposed in the narrow-width portion 28. The inflator 20 is disposed in the diffuser 22. According to the embodiment, the diffuser 22 is constructed such that a heat-resistance soft fabric or synthetic resin is formed in a cylindrical shape by stitching, and is arranged such that openings 22$a$ and 22$b$ at opposite ends thereof open in the lateral direction. Accordingly, when the inflator 20 emits gas in the diffuser 22, the gas from the inflator 20 is directed only in the lateral direction through the openings 22$a$ and 22$b$.

In the embodiment, as shown in FIG. 4, the diffuser 22 has a size to be inflated and project forward (toward the occupant) relative to the front surface of the interior panel 10 in the knee bag 18 through a pressure of the gas emitted from the inflator 20 in the diffuser 22. The diffuser 22 preferably has a size such that a projection length P (see FIG. 4) of the diffuser 22 from the front surface of the interior panel 10 is in the range from 60 mm to 100 mm, or the openings 22$a$ and 22$b$ preferably have an area exposed to the knee bag 18 at the portions projecting from the front surface of the interior panel in the range from 3,000 mm$^2$ to 7,850 mm$^2$.

The inflator 20 of the embodiment is shaped like a rod and disposed in the diffuser 22 such that a longitudinal direction thereof is aligned with the lateral direction. The inflator 20 has a gas port (not shown) in a side circumference thereof. The inflator 20 is provided with an inflator holder 34. The inflator holder 34 includes a base portion and a band portion (reference numeral omitted) for fixing the inflator 20 to the base portion. Stud bolts 34$a$ project from the base portion.

The stud bolts 34$a$ are inserted into bolt insertion holes (reference numeral omitted) provided in a rear surface of the diffuser 22 (opposite to the occupant) and the rear surface 18$b$ of the narrow-width portion 28 at the lower end. The stud bolts 34$a$ project to a backside of the knee bag 18 (opposite to the occupant) and are further inserted into bolt insertion holes (reference numeral omitted) provided in the retainer 16. Nuts 34$b$ are fastened to the stud bolts 34$a$, so that the inflator holder 34 is fixed in the retainer 16, and the rear surface of the diffuser 22 and the rear surface 18$b$ of the narrow-width portion 28 at the lower end are held between the inflator holder 34 and the retainer 16.

When a vehicle equipped with the occupant leg protection system 14 with such a structure collides at the front, the inflator 20 emits gas and the knee bag 18 starts to be inflated by the gas from the inflator 20. The knee bag 18 pushes the lid 24 to open and is inflated toward the front of the interior panel 10 to deploy upwardly along the interior panel 10. The constant width portion 26 at the upper part of the inflated knee bag 18 faces the vicinity of the occupant knees and receives them.

In the occupant leg protection system 14, the knee bag 18 has a shape in which the lower narrow-width portion 28 at the lower part has the smaller lateral width, or an upwardly expanded shape, and the gas from the inflator 20 disposed at the lower end of the narrow-width portion 28 flows upwardly through the vent spaces V between the lateral ends of the tethers 30 and 32 and the lateral edges of the narrow-width portion 28. Therefore, when the knee bag 18 is inflated, the narrow-width portion 28 is inflated first while expanding upwardly and laterally, then the constant width portion 26 located above the narrow-width portion 28 is inflated to extend laterally so as to connect the inflated portions of the lateral sides of the narrow-width portion 28. Lastly, the vicinity of the center of the knee bag 18 is inflated.

The upper tether 30 is disposed in the vicinity of or above the boundary between the constant width portion 26 and the narrow-width portion 28 and has a large lateral width. The constant width portion 26 has a relatively small volume to be inflated rapidly. Accordingly, the lateral sides and the upper constant width portion 26 of the knee bag 18 are inflated quickly, so that the knee bag 18 is quickly inflated laterally and upwardly.

According to the embodiment, the diffuser 22 is provided for directing the gas flow from the inflator 20 laterally, so that the knee bag 18 is deployed laterally quickly. Further, when the knee bag 18 is inflated, the diffuser 22 projects forward in the knee bag 18 from the front surface of the interior panel 10 by a length of 60 mm to 100 mm through the pressure of the gas emitted from the inflator 20. Therefore, the gas from the inflator 20 is emitted laterally through the lateral openings 22a and 22b of the diffuser 22 without striking against the inner surface of the knee bag 18 to change the direction. Accordingly, the gas from the inflator 20 can be effectively directed laterally.

In this embodiment each of the vent spaces V between the lateral ends of the tethers 30 and 32 and the lateral edges of the narrow-width portion 28 has the flow channel cross section in the range from 3,000 mm² to 7,850 mm². Accordingly, the gas flows upwardly quickly through the vent spaces V, and the knee bag 18 is inflated extremely rapidly.

The above-described embodiment is only an example of the invention, and the invention is not limited thereto. The disclosure of Japanese Patent Application No. 2003-415191, filed on Dec. 12, 2003, is incorporated in the application.

While the invention has been explained with reference to the specific embodiments of the invention, the explanation is illustrative and the invention is limited only by the appended claims.

What is claimed is:

1. A knee bag, comprising:
   a constant width portion having a substantially rectangular shape with a substantially equal lateral width to form an upper portion of the knee bag,
   a narrow width portion having a substantially triangular shape with a rounded bottom and linear side portions, and a lateral width decreasing downwardly and extending downwardly from the constant width portion,
   a plurality of tethers for connecting front and rear portions of the knee bag and extending laterally, said tethers being disposed vertically in multistage so that an upper tether has a longer lateral length than a lower tether, said tethers including an uppermost tether located at least above a vicinity of a boundary between the constant width portion and the narrow width portion, and
   vent spaces formed between lateral ends of the tethers and the linear side portions of the knee bag,
   wherein an imaginary line connecting one lateral end of the upper tether and one lateral end of the lower tether at a side same as the one lateral end of the upper tether is parallel to one of the linear side portions close to the lateral ends of the upper and lower tethers, and another imaginary line connecting the other lateral end of the upper tether and the other lateral end of the lower tether is parallel to the other of the linear side portions so that the knee bag is inflated upwardly in front of legs of a vehicle occupant while a gas is smoothly introduced to the constant width portion through the vent spaces along the linear side portions.

2. A knee bag according to claim 1, further comprising a diffuser disposed at a lower portion of the knee bag for directing gas from an inflator only in lateral directions.

3. A knee bag according to claim 1, wherein each of said vent spaces has a flow channel cross section of 3,000 mm² to 7,850 mm² when the knee bag is inflated.

4. A knee bag according to claim 2, wherein said vent spaces incline laterally upwardly from a lower portion of the knee bag to form a V-shape.

5. A knee bag according to claim 4, wherein said diffuser includes two outlets facing the vent spaces.

6. An occupant leg protection system comprising said knee bag according to claim 1, and an inflator for inflating the knee bag.

7. A knee bag according to claim 5, wherein said diffuser has a lateral length substantially same as that of the lower tether.

* * * * *